United States Patent
Ji et al.

(10) Patent No.: US 8,005,144 B2
(45) Date of Patent: Aug. 23, 2011

(54) BI-DIRECTIONAL PREDICTING METHOD FOR VIDEO CODING/DECODING

(75) Inventors: Xiangyang Ji, Beijing (CN); Wen Gao, Beijing (CN); Debin Zhao, Beijing (CN); Yan Lu, Beijing (CN); Siwei Ma, Beijing (CN); Honggang Qi, Beijing (CN)

(73) Assignee: Institute of Computing Technology Chinese Academy of Sciences, Beijing (CN)

( * ) Notice: Subject to any disclaimer, the term of this patent is extended or adjusted under 35 U.S.C. 154(b) by 1289 days.

(21) Appl. No.: 10/571,659

(22) PCT Filed: Jul. 2, 2004

(86) PCT No.: PCT/CN2004/000735
§ 371 (c)(1),
(2), (4) Date: Dec. 11, 2006

(87) PCT Pub. No.: WO2005/027520
PCT Pub. Date: Mar. 24, 2005

(65) Prior Publication Data
US 2007/0110156 A1   May 17, 2007

(30) Foreign Application Priority Data

Sep. 12, 2003   (CN) .............................. 2003 1 57077

(51) Int. Cl.
*H04N 7/12* (2006.01)
*H04N 11/02* (2006.01)
*H04N 11/04* (2006.01)

(52) U.S. Cl. ......... 375/240.16; 375/240.12; 375/240.13; 375/240.14; 375/240.15

(58) Field of Classification Search . 375/240.12–240.16
See application file for complete search history.

(56) References Cited

U.S. PATENT DOCUMENTS

| | | | | |
|---|---|---|---|---|
| 5,293,229 A | * | 3/1994 | Iu | 375/240.15 |
| 6,442,204 B1 | * | 8/2002 | Snook et al. | 375/240.16 |
| 2002/0001411 A1 | * | 1/2002 | Suzuki et al. | 382/238 |

* cited by examiner

*Primary Examiner* — Christopher S Kelley
*Assistant Examiner* — Chikaodili Anyikire
(74) *Attorney, Agent, or Firm* — J.C. Patents

(57) ABSTRACT

The invention discloses a bi-directional prediction method for video coding/decoding. When bi-directional prediction coding at the coding end, firstly the given forward candidate motion vector of the current image block is obtained for every image block of the current B-frame; the backward candidate motion vector is obtained through calculation, and the candidate bi-directional prediction reference block is obtained through bi-directional prediction method; the match is computed within the given searching scope and/or the given matching threshold; finally the optimal matching block is selected to determine the final forward motion vector, and the backward motion vector and the block residual. The present invention achieves the object of bi-directional prediction by coding a single motion vector, furthermore, it will not enhance the complexity of searching for a matching block at the coding end, and may save amount of coding the motion vector and represent the motion of the objects in video more actually. The present invention realizes a new prediction coding type by combining the forward prediction coding with the backward.

7 Claims, 4 Drawing Sheets

BI-DIRECTIONAL PREDICTING METHOD FOR VIDEO CODING/DECODING

FIELD OF THE INVENTION

The present invention relates to a bi-directional prediction method for video coding at the coding/decoding end, and more particularly to a bi-directional prediction method for compressing the video, which belongs to the field of video coding/decoding.

BACKGROUND OF THE INVENTION

Generic Technology of these flourishing high technology industries such as digital television, new generation mobile communications, broadband communications network and family consuming electronics focuses on multimedia of which the main content is video and audio processing technology, particularly on the data compressing technology. High-efficient video coding/decoding technology is the key of realizing high quality and low cost for storing and transmitting multimedia data. At present, the conventional coding methods include predictive coding, orthogonal transform coding, vector quantization coding, etc. All these methods are based on the signal processing theory, usually called first generation coding technology. The popular international coding standards for images are based on this coding theory which adopts coding method combined of motion compensation based on block matching, discrete cosine transform and quantization. Typically, the first joint technology committee of International Standardization Organization/International Electro-technical Commission (ISO/IEC JTC1) proposes motion picture experts group (namely to MPEG)-1, MPEG-2 and MPEG-4 and such international standards; and the International Telecom Union(ITU-T) proposes the H.26x series. These video coding standards are widely used in the industries.

All these standards for video coding adopt Hybrid Video Coding strategy normally including four main modules such as predicting, transforming, quantizing and information entropy coding. wherein, the function of predicting module is to predict the current image to be coded by using the coded and reconstructed image (inter prediction), or to predict the current image block to be coded by using the coded and reconstructed image block in images (intra prediction); the function of the transforming module is to convert the image block inputted into another space so as to converge the energy of inputted signals at transform coefficient of low frequency for lowering relativity among the elements within the image block, and being useful for compressing; the main function of quantizing module is to map the transformed coefficients into a limited element aggregate advantageous to coding; and the main function of information entropy coding module is to represent the quantized transform coefficient with variable length code according to the statistical principle. The video decoding system has similar modules, of which to reconstruct the decoded image through the procedures of entropy decoding, inverse quantizing, inverse transforming etc. Besides the above modules, the video coding/decoding system usually also includes some assistant coding tools, which dedicate to coding performance (compression ratio) of the whole system.

Most coding efficiency of video coding is from prediction based on motion compensation. The main function of the prediction based on motion compensation is to eliminate redundancy of video series on time. The procedure of the video coding. is to code each frame image of video series which is realized by the prediction module. The conventional video coding system which codes each frame image is based on. image block as a basic unit. When coding each frame image, there are intra coding (I frame), prediction coding (P frame), bi-directional prediction (B frame) coding, etc. Generally, when coding, I frame, P frame and B frame coding are interlarded, for example based on IBBPBBP sequence.

The introduction of B frame may effectively solve occlusion problem caused by different motion directions and motion rate between motion objects or between objects and their background. B frame coding may achieve a bit rate of over 200:1 for coding and compression efficiency. Coding. the image block of B frame includes four modes: direct, forward prediction, backward prediction and bi-directional prediction. Since the B frame technology needs to process forward and backward motion estimation simultaneously, higher computation complexity is needed. At the same time, in order to discriminate forward and backward motion vectors, the extra identification information is needed to introduce into.

In conventional video coding system, B frame usually possesses the motion mode of bi-directional prediction, for which can effectively eliminate inaccuracy of inter prediction caused by the rotation of images, variation of luminance, noise, etc. However, more motion vectors are needed to be coded at same time. Hence, the bit number for coding motion vector in proportion to the whole process of coding is usually more than 30%.

Therefore, if there is a method which can lower coding for motion vectors under the precondition of keeping nice bi-directional prediction performance, it will effectively improve compression ratio of coding especially meaningful for the application of video transmitting at low bit rate and lowering bit number to be needed in coding motion vectors.

SUMMARY OF INVENTION

The technical problem solved by the present invention is focused on a bi-directional prediction method for video coding at the coding end, which can lower the quantity of the motion vectors to be coded effectively without enhancing the complexity of searching for a matching block for coding in substance.

The technical solution of the present invention is as follows:

A bi-directional prediction method for video coding at the coding end comprises the steps of:

10) obtaining a forward candidate motion vector of a current image block from a forward reference image for every image block of a current B-frame by using a forward prediction mode;

20) calculating to obtain a backward candidate motion vector, a forward candidate motion vector and a backward candidate motion vector needed by a bi-directional prediction by using the forward candidate motion vector of the current image block obtained from step 10);

30) obtaining a candidate bi-directional prediction reference block by a bi-directional prediction method using the forward candidate motion vector and the backward candidate motion vector of the current image block obtained from step 20);

40) continuously setting a new reference block within a given searching scope and/or before the matching value is less than or equal to a pre-given matching threshold, repeating steps 10)-30) to select an optimal reference block;

50) coding a forward motion vector, a backward motion vector and a block residual of the image block determined by the optimal reference block into a code stream.

A bi-directional prediction method for video coding at the decoding end, comprising the steps of:

21) decoding a code stream to obtain a forward motion vector;
31) calculating to obtain a backward motion vector by using the forward motion vector obtained from step 21), therefore obtaining the forward motion vector and the backward motion vector needed for bi-directional prediction;
41) obtaining a final bi-directional prediction reference block by a bi-directional prediction method using the forward motion vector and the backward motion vector of the current image block obtained from step 31);
51) combining the prediction reference block obtained from step 41) with the corresponding block residua obtained from decoding the code stream to form a current image block.

The bi-directional predicting method for video coding of the present invention, which is also called single motion vector bi-directional prediction method, realizes the object of the bi-directional prediction by coding a single motion vector and obtaining another motion vector by computation. The method of the present invention will not enhance the complexity of searching for a matching block for coding in substance, furthermore, the method of the present invention may represent the motion of object in video more actually to obtain more accurate motion vector prediction. A new prediction coding is realized by combining the forward prediction coding and the backward prediction coding

DETAILED DESCRIPTION OF THE PREFERRED EMBODIMENTS

The solution provided by the present invention will be further described in details with reference to the accompanying drawings and the preferred embodiments in the following.

In the embodiments of the present invention, assuming that only a forward reference picture and a backward reference picture perform motion estimation to the image block of the current B frame at the forward and backward reference frames.

Figure 4:
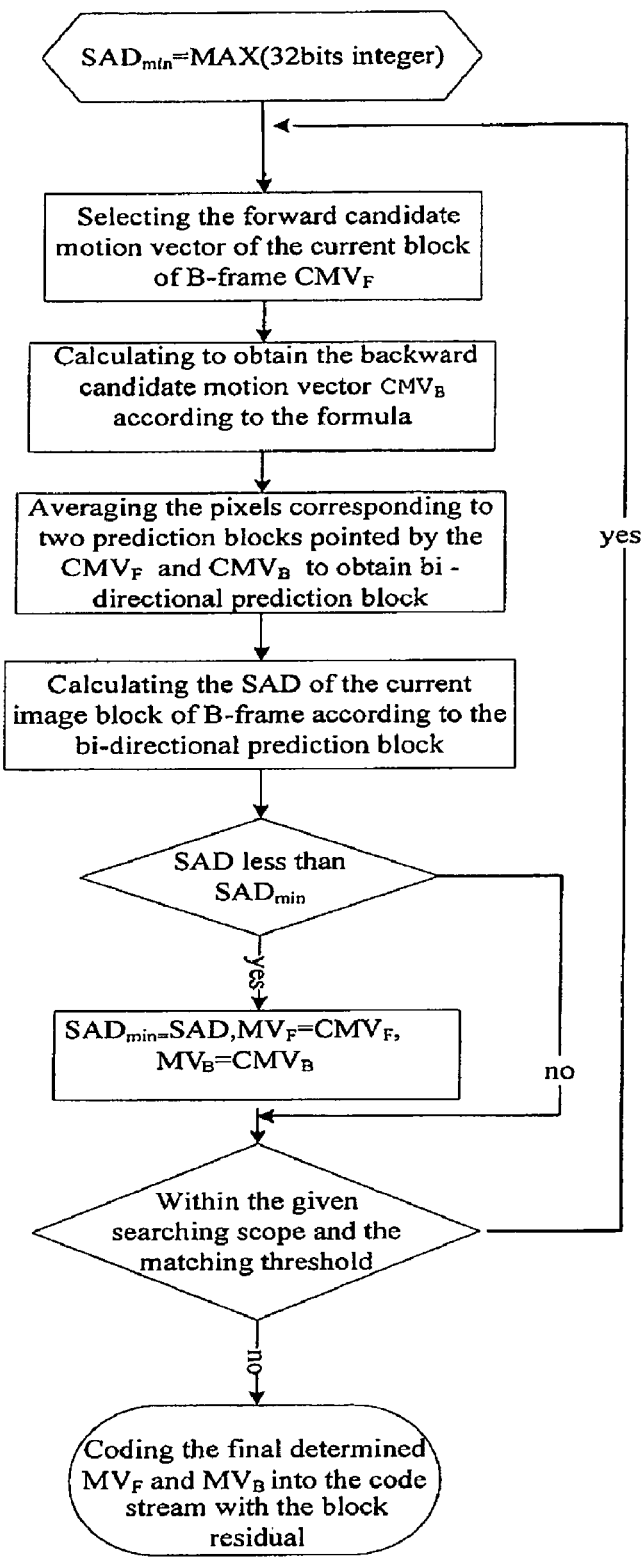
FIG. 4 is a flowchart of the bi-directional prediction of realizing motion estimation for coding and gaining the forward motion vector to calculate the backward motion vector and finally find out the optimal matching block.

In the embodiment of the bidirectional prediction method for video coding at the coding end of the present invention, said bi-directional prediction method for coding as shown in FIG. 4, comprises the steps of:

10) obtaining a forward candidate motion vector of a current image block from a forward reference image for every image block of a current B-frame by-using a forward prediction mode;

Said forward prediction mode particularly includes:
101) if the forward reference picture includes the given reference block, proceeding to 102), or else proceed to 103);
102) subtracting the position of the given reference block in the forward reference picture from the position of the current image block of the B frame in the current picture to obtain a motion vector as the forward candidate motion vector; ending 10);
103) selecting an image block in a forward reference picture with the same position as the image block of the current B frame to be a given reference block in the forward reference picture, and proceeding to step 102).

Because the image time interval between two Because the interval of two adjacent forward and backward frames is short without much difference, firstly select the point with the same position as that of the reference picture to be a reference point, and the forward motion vector candidate here is 0, there is no position changed between the both; if changing the reference point by the following step 40), the forward motion vector candidate would not be 0.

20) calculating to obtain a backward candidate motion vector by using the forward candidate motion vector of the current image block. obtained from step 10), therefore obtaining the forward candidate motion vector and the backward candidate motion vector needed for bidirectional prediction; the detailed procedure is as follows:

Frame Coding Mode:
In this mode, the forward candidate motion vector and the backward candidate motion vector of the current block can be calculated by the following formula:

$$CMV_B = -\left(\frac{TD_D - TD_B}{TD_B}\right) \times CMV_F$$

Figure 1:
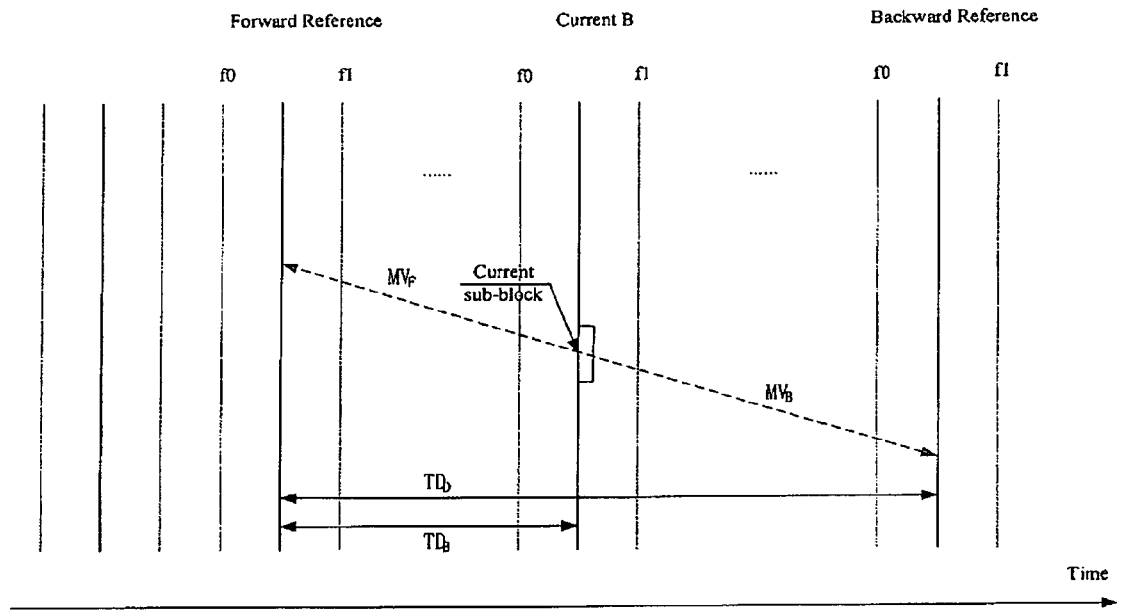
FIG. 1 is a sketch drawing showing the deducing procedure of the backward motion vector in the frame coding.

Here, $TD_B$ represents a distance in a time domain between the current frame and the forward reference frame, $TD_D$ representing a distance in a time domain between the backward reference frame and the forward reference frame, $CMV_F$ and $CMV_B$ respectively representing the forward candidate motion vector and the backward candidate motion vector corresponding to the current block of the B-frame, as shown in FIG. 1.

Field Coding Mode:
In the odd field mode, the forward candidate motion vector and the backward candidate motion vector of the current block can be calculated by the following formula:

$$CMV_{B,i} = -\left(\frac{TD_{D,i} - TD_{B,i}}{TD_{B,i}}\right) \times CMV_{F,i}$$

Figure 2:
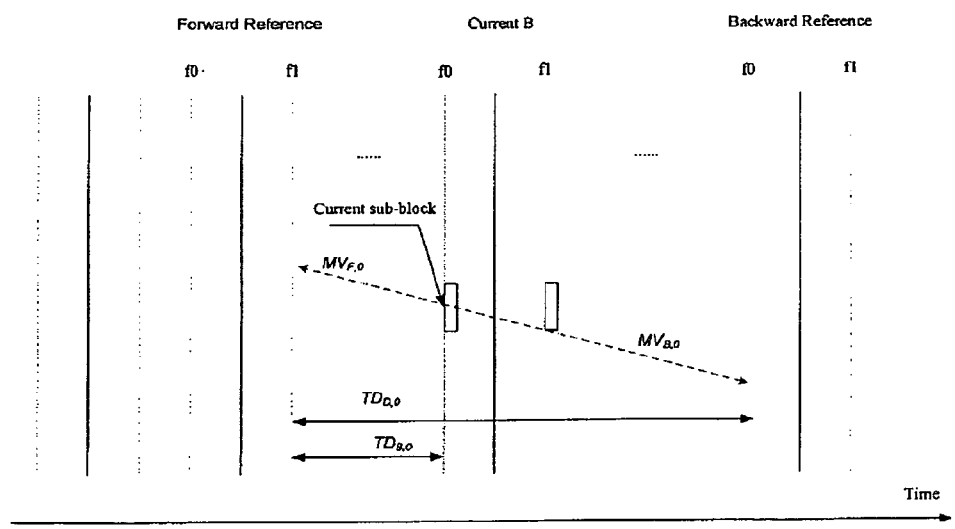
FIG. 2 is a sketch drawing showing the deducing procedure of the backward-motion vector in the field coding when the motion vector of the corresponding block of the backward reference field points to some field prior to the current field in the time domain in the odd field or the even field.

$TD_B$ represents a distance between in a time domain the current picture and the forward reference picture, $TD_D$ represents a distance in a time domain between the forward reference picture and the backward reference picture, $CMV_F$ and $CMV_B$ respectively represents the deduced forward candidate motion vector and the backward motion vector candidate corresponding to the current block of the B-frame; the value of suffix i is determined by the odd field or even field mode, and the value of suffix i is 0 while it is the odd field mode, or the value of suffix I is 1 while it is the even field mode, as shown in FIG. 2.

In the even field mode, if a motion vector of a corresponding block of a backward reference field points to a field prior to the current field in the time domain, the backward motion vector's deduction is consistent with that in the odd field.

When a motion vector of a corresponding block of a backward reference field points to a corresponding odd field belonging to the same frame as the even field, the a forward candidate motion vector and a backward candidate motion vector of the current block are deducted by the following formula:

$$CMV_{B,1} = \left(\frac{TD_{D,1} + TD_{B,1}}{TD_{B,1}}\right) \times CMV_{F,1}$$

Figure 3:
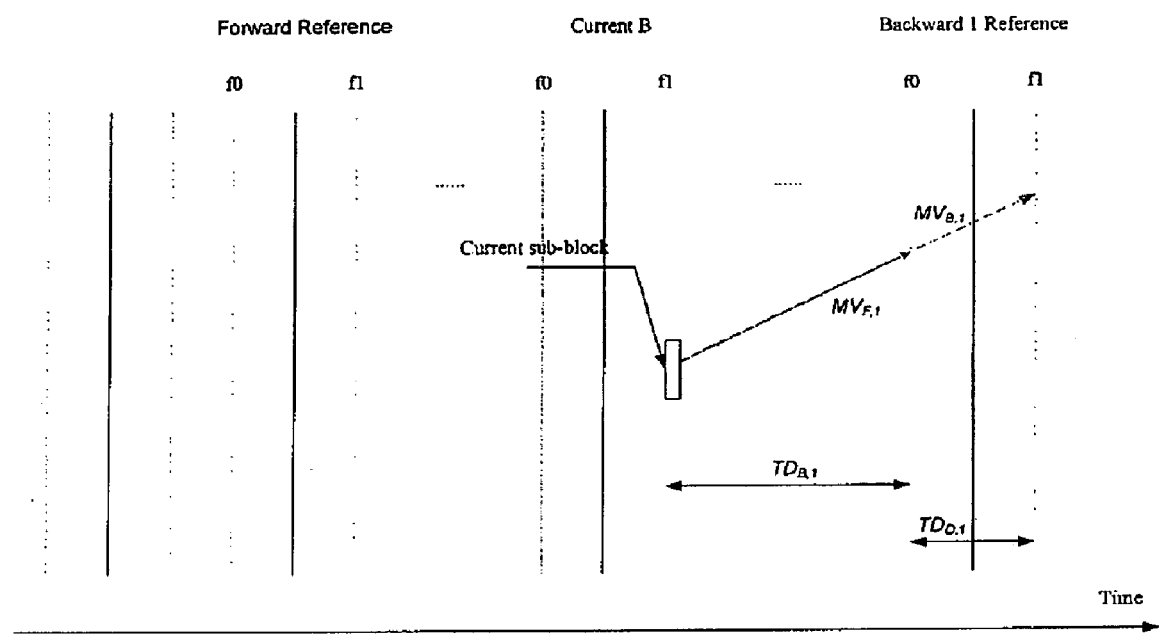
FIG. 3 is a sketch drawing showing the deducing procedure of the backward motion vector in the field coding when the motion vector of the corresponding block of the backward reference field points to the odd field which belongs to the same frame as the even field.

$TD_B$ represents a distance in a time domain between the current picture and the forward reference picture, $TD_D$ representing a distance in a time domain between the forward reference picture and the backward reference picture, $CMV_F$ and $CMV_B$ respectively represents the deduced forward candidate motion vector and the backward candidate motion vector corresponding to the current block of the B-frame, as shown in FIG. 3.

30) obtaining a candidate bi-directional prediction reference block by a bi-directional prediction method using the forward candidate motion vector and the backward candidate motion vector of the current image block obtained from step 20); that is to say, averaging pixels corresponding to two prediction reference blocks pointed by the forward candidate motion vector and the backward candidate motion vector to obtain a final bidirectional prediction reference block.

40) continuously setting a new reference block within a given searching scope and/or before the matching value is less than or equal to a pre-given match threshold, repeating former three steps and finally selecting an optimal reference block;

In step 40), the searching scope is a certain area centered round a reference block with the same position as the image block of the current B frame in the reference picture, the size of the searching scope is different due to the different image quality required, and the larger the searching area is, the more accurate the gained reference block is. The searching scope can be maximumly covered the whole reference picture. A sum of absolute differences (denoted by SAD) between the bi-directional prediction reference block calculated by the reference block in the entire searching scope and corresponding pixels of the block of the current B frame is the optimal reference block.

Said matching value in step 40) is a sum of absolute differences (SAD) between the bi-directional prediction reference block and corresponding pixels of the current block of the B-frame. The matching threshold is a pre-given matching value, and if the matching value is less than or equal to the matching threshold, the current reference block is the optimal reference block. Generally, compute the matching value of the reference block by taking the current reference block as the basis point from the near to the far according to some certain sequence. It has high efficiency of using the method of setting the matching threshold, which can find out the reference block fitting for the requirement to end the searching procedure of the optimal reference block without the necessity to cover all the reference points.

In the above two methods, the method of computing SAD is used to represent the difference between the bi-directional prediction reference block and the current block of the B-frame while other methods can also be adopted, for example calculating the variance of the corresponding pixel, but they are not as visual and efficient as the SAD method.

Certainly, the method of combining searching area and setting matching threshold can be adopted, as shown in FIG. 4 to compute the matching value from the near to the far in the given area so as to determine the searching scope by requirement, which is high efficient without the necessity to cover all the searching scope with high efficiency.

50) Coding the forward motion vector, the backward motion vector and block residual of the image block determined by an optimal matching block into a code stream. Said block residual includes a difference of corresponding pixels between the bi-directional reference block determined by the optimal reference block and the current block of the B frame, a difference sequence of corresponding pixels between the optimal reference block and the block of the current B frame can be directly coded or compressed conveniently for transmitting.

Figure 5:
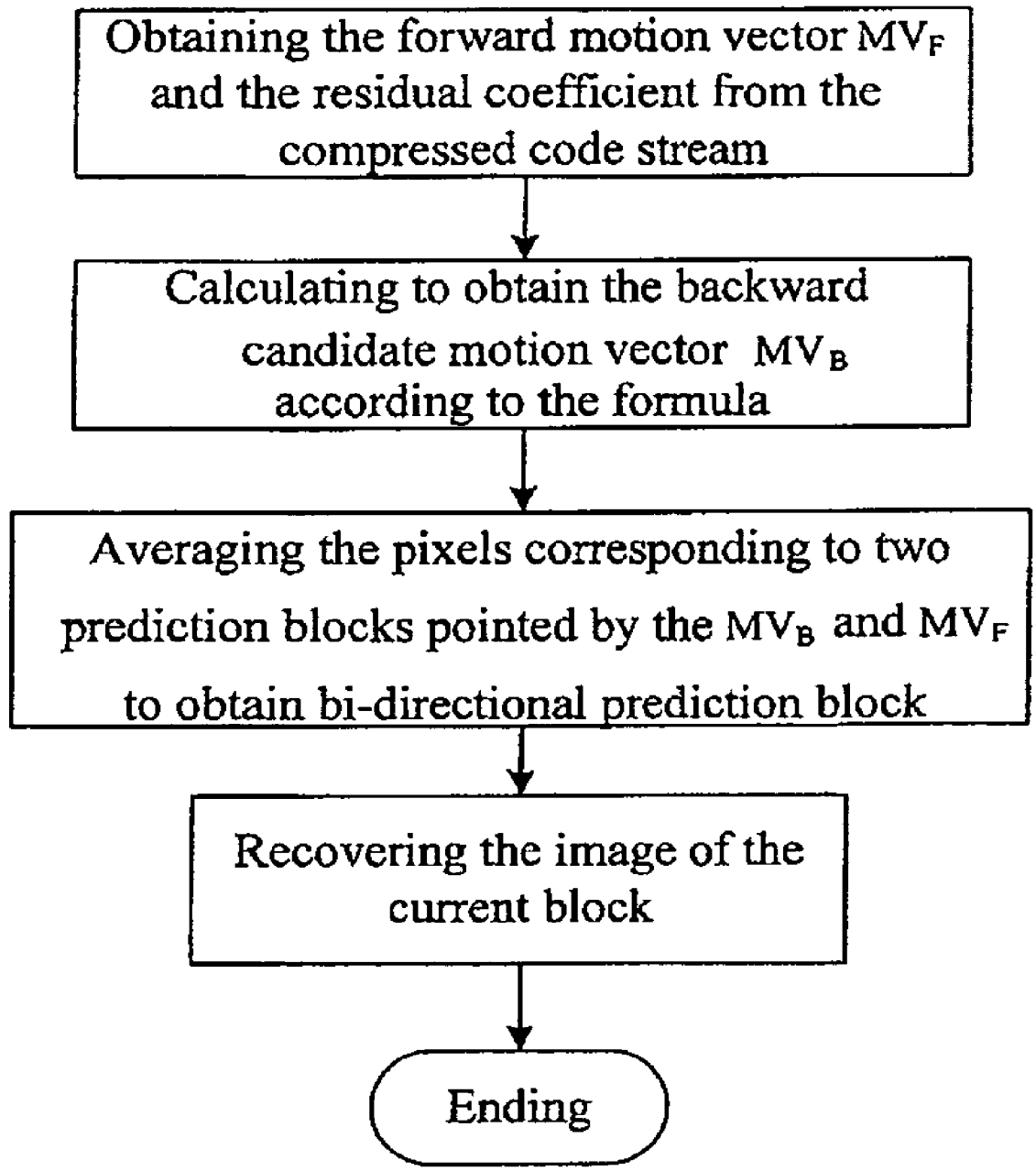
FIG. 5 shows the procedure of how to gain the forward motion vector to deduce the backward motion vector from the code stream for decoding and reconstruct some image block by the bi-directional prediction compensation finally.

As shown in FIG. 5, said bidirectional prediction decoding method of a bidirectional prediction method for video decoding of the embodiment in the present invention comprises the steps of:

21) decoding a code stream to obtain a forward motion vector;

31) calculating to obtain a backward motion vector by using the forward motion vector obtained from step 21), therefore obtaining the forward motion vector and the backward motion vector needed for bi-directional prediction;

41) obtaining a final bidirectional prediction reference block by a bi-directional prediction method using the forward motion vector and the backward motion vector of the current image block obtained from step 31);

51) combining the prediction reference block obtained from step 41) with the corresponding block residua obtained from decoding the code stream to form a current image block.

The procedure of said calculating a backward motion vector in step 31) includes:

310) discriminating a current image mode, and if it is the frame coding mode, proceeding to step 311); if it is the field coding mode, discriminating whether it is the odd field or even field, if it is the odd field, proceeding to step 312), if it is the even field, proceeding to step 313);

311) calculating to obtain a backward motion vector by the following formula:

$$MV_B = -\left(\frac{TD_D - TD_B}{TD_B}\right) \times MV_F$$

$TD_B$ representing a distance in a time domain between the current picture and the forward reference picture, $TD_D$ representing a distance in a time domain between the forward reference picture and the backward reference picture, $MV_F$ and $MV_B$ respectively representing the forward motion vector and the backward motion vector corresponding to the block of current B-frame; ending step 31);

312) calculating to obtain a backward motion vector by the following formula:

$$MV_{B,i} = -\left(\frac{TD_{D,i} - TD_{B,i}}{TD_{B,i}}\right) \times MV_{F,i}$$

$TD_B$ representing a distance in a time domain between the current picture and the forward reference picture, $TD_D$ representing a distance in a time domain between the forward reference picture and the backward reference picture, $MV_F$ and $MV_B$ respectively representing the forward and the backward motion vector corresponding to the block of current B-frame; ending step 31);

313) when a motion vector of a corresponding block of a backward reference field pointing to a field prior to the current field in the time domain, proceeding to step 312); when a motion vector of a corresponding block of a backward reference field pointing to a corresponding odd field belonging to the same frame as the even field, calculating to obtain a backward motion vector by the following formula:

$$MV_{B,1} = \left(\frac{TD_{D,1} + TD_{B,1}}{TD_{B,1}}\right) \times MV_{F,1}$$

$TD_B$ representing a distance in a time domain between the current picture and the forward reference picture, $TD_D$ representing a distance in a time domain between the forward reference picture and the backward reference picture, $MV_F$ and $MV_B$ respectively representing the deduced forward motion vector and the backward motion vector corresponding to the block of current B-frame; ending step 31).

The procedure of said bi-directional prediction method in step 41) includes:

Averaging pixels corresponding to two prediction reference blocks pointed by the forward motion vector and the backward motion vector to obtain a final bi-directional prediction reference block.

The decoding procedure is very simple, after obtaining the forward motion vector from a code stream, calculating to obtain a backward motion vector directly, combining the bi-directional prediction reference block and the block residual into the image before coding.

The procedure can be deemed as the inverse procedure of the coding procedure.

It should be understood that the above embodiments are used only to explain, but not to limit the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A bi-directional prediction method for video coding at the coding end, characterized in that it comprises the steps of:
   10) obtaining a forward candidate motion vector of a current image block from a forward reference image for every image block of a current B-frame by using a forward prediction mode; wherein the procedure of said obtaining a forward candidate motion by using a forward prediction mode in step 10) includes:
      101) selecting an image block in a forward reference picture with the same postion as the current image block of the B-frame to be a given reference block in the forward reference picture if it is a first time, and proceeding to step 102); or else proceeding to step 102) directly;
      102) subtracting the position of the given reference block in the forward reference picture from the position of the current image block of the B-frame to obtain a vector, i.e. the forward candidate motion vector; ending step 10);
   20) calculating to obtain a backward candidate motion vector by using the forward candidate motion vector of the current image block obtained from step 10), therefore obtaining the forward candidate motion vector and the backward candidate motion vector needed for bi-directional prediction; wherein the procedure of said calculating a backward candidate motion vector in step 20) includes:
      110) discriminating a current image mode, and if it is a frame coding mode, proceeding to step 111); if it is a field coding mode, discriminating whether it is an odd field or even field, and if it is the odd field, proceeding to step 112), if it is the even field, proceeding to step 113);
      111) calculating to obtain the backward candidate motion vector by the following formula:

$$CMV_B = -\left(\frac{TD_D - TD_B}{TD_B}\right) \times CMV_F$$

$TD_B$ representing a distance in a time domain between a current picture and the forward reference picture, $TD_D$ representing a distance in a time domain between the forward reference picture and the backward reference picture, $CMV_F$ and $CMV_B$ respectively representing the forward motion vector candidate and the backward motion vector candidate corresponding to the current block of the B-frame; ending step 20);
      112) calculating to obtain the backward candidate motion vector by the following formula:

$$CMV_{B,i} = -\left(\frac{TD_{D,i} - TD_{B,i}}{TD_{B,i}}\right) \times CMV_{F,i}$$

$TD_B$ representing a distance in a time domain between the current picture and the forward reference picture, $TD_D$ representing a distance in a time domain between the forward reference picture and the backward reference picture, $CMV_F$ and $CMV_B$ respectively representing the deduced forward candidate motion vector and the backward candidate motion vector corresponding to the current block of the B-frame; ending step 20);

113) when a motion vector of a corresponding block of a backward reference field pointing to a field prior to the current field in the time domain, proceeding to step 112); when the motion vector of the corresponding block of the backward reference field pointing to a corresponding odd field belonging to the sameframe as the even field, calculating to obtain the backward candidate motion vector by the following formula:

$$CMV_{B,1} = \left(\frac{TD_{D,1} + TD_{B,1}}{TD_{B,1}}\right) \times CMV_{F,1}$$

TD$_B$ representing a distance in a time domain between the current picture and the forward reference picture, TD$_D$ representing a distance in a time domain between the forward reference picture and the backward reference picture, CMV$_F$ and CMV$_B$ respectively representing the deduced forward candidate motion vector and the backward candidate motion vector corresponding to the current block of the B-frame; ending step 20);

30) obtaining a candidate bi-directional prediction reference block by a bi-directional prediction method using the forward candidate motion vector and the backward candidate motion vector of the current image block obtained from step 20);

40) setting a new reference block before a matching value is less than or equal to a pre-given matching threshold, repeating steps 10)-30) to select an optimal reference block;

50) coding a forward motion vector, a backward motion vector and a block residual of the image block determined by the optimal reference block into a code stream.

2. The bi-directional prediction method for video coding at the coding end as claimed in claim 1, wherein the procedure of said bi-directional prediction method in step 30) includes: averaging pixels corresponding to two prediction reference blocks pointed by the forward candidate motion vector and the backward candidate motion vector to obtain a final bi-directional prediction reference block.

3. The bi-directional prediction method for video coding at the coding end as claimed in claim 1, wherein the searching scope in step 40) is a certain area centered round a reference block with the same position as the current image block of the B-frame in the reference picture, which can maximumly cover the whole reference picture, and the reference block with a smallest sum of absolute differences between a pixel of the bi-directional prediction reference block calculated by the reference block in the entire searching scope and a corresponding pixel of the current block of the B-frame, is the optimal reference block.

4. The bi-directional prediction method for video coding at the coding end as claimed in claim 1, wherein said matching value in step 40) is a sum of absolute differences between the pixel of the bi-directional prediction reference block and the corresponding pixel of the current block of the B-frame; and the matching threshold in step 40) is a pre-given matching value, if the matching value is less than or equal to the matching threshold, the current reference block is the optimal reference block.

5. The bi-directional prediction method for video coding at the coding end as claimed in claim 1, wherein said block residual includes a difference of corresponding pixels between the optimal reference block and the current block of the B-frame.

6. A bi-directional prediction method for video coding at the decoding end, characterized in that it comprises the steps of:

21) decoding a code stream to obtain a forward motion vector;

31) calculating to obtain a backward motion vector by using the forward motion vector obtained from step 21), therefore obtaining the forward motion vector and the backward motion vector needed for bi-directional prediction; wherein the procedure of said calculating a backward motion vector in step 31) includes:

310) discriminating a current image mode, and if it is the frame coding mode, proceeding to step 311); if it is the field coding mode, discriminating whether it is the odd field or even field, if it is the odd field, proceeding to step 312); if it is the even field, proceeding to step 313);

311) calculating to obtain a backward motion vector by the following formula:

$$MV_B = -\left(\frac{TD_D - TD_B}{TD_B}\right) \times MV_F$$

TD$_B$ representing a distance in a time domain between the current picture and the forward reference picture, TD$_D$ representing a distance in a time domain between the forward reference picture and the backward reference picture, MV$_F$ and MV$_B$ respectively representing the forward motion vector and the backward motion vector corresponding to the current block of B-frame; ending step 31);

312) calculating to obtain a backward motion vector by the following formula:

$$MV_{B,i} = -\left(\frac{TD_{D,i} - TD_{B,i}}{TD_{B,i}}\right) \times MV_{F,i}$$

TD$_B$ representing a distance in a time domain between the current picture and the forward reference picture, TD$_D$ representing a distance in a time domain between the forward reference picture and the backward reference picture, MV$_F$ and MV$_B$ respectively representing the deducted forward motion vector and the backward motion vector corresponding to the current block of the B-frame; ending step 31);

313) when a motion vector of a corresponding block of a backward reference field pointing to a field prior to the current field in the time domain, proceeding to step 312); when a motion vector of a corresponding block of a backward reference field pointing to a corresponding odd field belonging to the same frame as the even field, calculating to obtain a backward motion vector by the following formula:

$$MV_{B,1} = \left(\frac{TD_{D,1} - TD_{B,1}}{TD_{B,1}}\right) \times MV_{F,1}$$

TD$_B$ representing a distance in a time domain between the current picture and the forward reference picture, $TD_D$ representing a distance in a time domain between the forward reference picture and the backward reference picture, $MV_F$ and $MV_B$ respectively representing the deduced forward motion vector and the backward motion vector corresponding to the current block of the B-frame; ending step 31);

41) obtaining a final bi-directional prediction reference block by a bi-directional prediction method using the forward motion vector and the backward motion vector of the current image block obtained from step 31);

51) combining the prediction reference block obtained from step 41) with the corresponding block residual obtained from decoding the code stream to form the current image block.

7. The bi-directional prediction method for video coding at the decoding end as claimed in claim 6, wherein the procedure of said bi-directional prediction method in step 41) includes:

averaging pixels corresponding to two prediction reference blocks pointed by the forward motion vector and the backward motion vector to obtain a the final bi-directional prediction reference block.

* * * * *